(12) United States Patent
Nagaralu et al.

(10) Patent No.: US 7,953,879 B1
(45) Date of Patent: May 31, 2011

(54) SYSTEM AND METHOD FOR ASSIGNING SYMBOLIC NAMES TO DATA STREAMS

(75) Inventors: Sree Hari Nagaralu, Pune (IN); Murali Nagaraj, Pune (IN); Nookala Sunder Phani Kumar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1052 days.

(21) Appl. No.: 11/344,513

(22) Filed: Jan. 31, 2006

(51) Int. Cl.
G06F 15/16 (2006.01)
G06F 17/00 (2006.01)

(52) U.S. Cl. ......... 709/231; 707/609; 707/736; 707/821

(58) Field of Classification Search .................. 709/231; 707/609, 736, 821
See application file for complete search history.

(56) References Cited

U.S. PATENT DOCUMENTS

| | | | | |
|---|---|---|---|---|
| 5,412,808 A * | 5/1995 | Bauer | | 707/1 |
| 5,437,024 A * | 7/1995 | French | | 707/10 |
| 5,568,487 A * | 10/1996 | Sitbon et al. | | 370/466 |
| 5,664,178 A * | 9/1997 | Sinofsky | | 1/1 |
| 5,765,164 A * | 6/1998 | Prasad et al. | | 1/1 |
| 6,970,888 B1 | 11/2005 | Sciarra | | 707/200 |
| 7,113,964 B1 * | 9/2006 | Bequet et al. | | 707/661 |
| 7,606,924 B2 * | 10/2009 | Raz et al. | | 709/231 |
| 7,836,404 B2 * | 11/2010 | Dietz et al. | | 715/748 |
| 2006/0149704 A1 * | 7/2006 | Wyatt et al. | | 707/2 |
| 2006/0288113 A1 * | 12/2006 | Saunders et al. | | 709/231 |

OTHER PUBLICATIONS

*Microsoft Corporation, Windows Script Host: TargetPath Property*, accessed Jun. 2005. pp. 1-3.

* cited by examiner

*Primary Examiner* — Krisna Lim
(74) *Attorney, Agent, or Firm* — Campbell Stephenson LLP

(57) ABSTRACT

Various embodiments of methods and systems for assigning symbolic names to data streams within a file are disclosed. In one embodiment, a method involves receiving a request to access a file that includes multiple data streams and then selecting one of the data streams to be accessed, based on the symbolic name. In response to identifying that one of the data streams is associated with the symbolic name, that data stream is accessed.

22 Claims, 4 Drawing Sheets

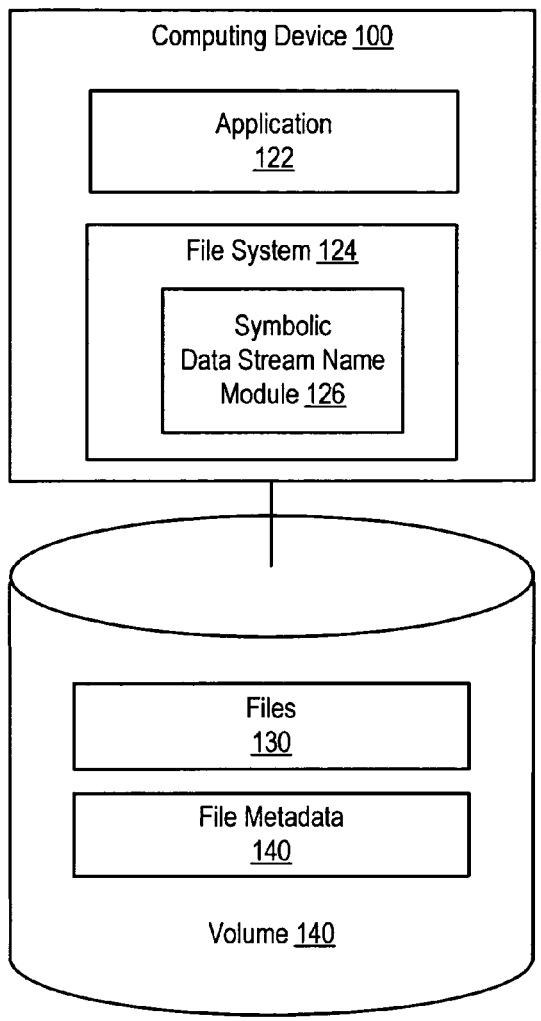
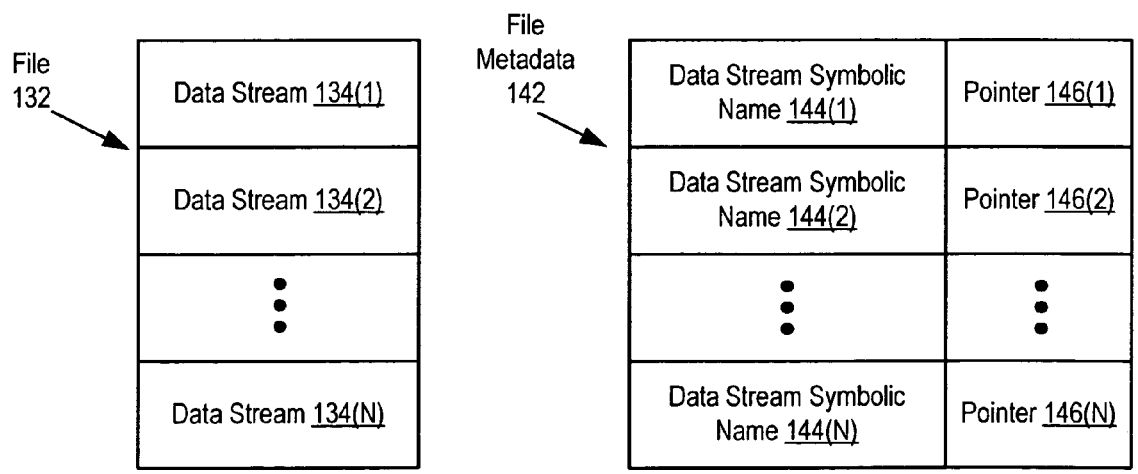
FIG. 1
FIG. 2

SYSTEM AND METHOD FOR ASSIGNING SYMBOLIC NAMES TO DATA STREAMS

FIELD OF THE INVENTION

This invention relates to data processing systems and, more particularly, to managing multiple data streams within a file.

DESCRIPTION OF THE RELATED ART

User data is organized into files. Various different types of files (e.g., word processing files, text files, image files, audio and/or video files, multimedia files, and the like) are used by different applications. Each file, regardless of type, has a name, which is a string of alphanumeric characters. By specifying that name (e.g., by selecting that file name from an "open" menu within an application), the user can access the information that is stored within the file.

Each file can include multiple data streams. Each data stream can include some sort of data (e.g., text, images, audio or video data, and the like). Typically, an application that accesses a particular type of file will open the "unnamed" data stream when opening files. For example, a word processing application will open the unnamed data stream, which includes text and formatting entered by a user, when opening a word processing file. Other named data streams can store other information. For example, some word processing applications use a separate data stream to store information identifying file characteristics (e.g., author, amount of editing time, creation time, file attributes, and the like) of a file. In general, data streams can be used to store any type of information, and this information need not be the same as the type of information stored by the default data stream.

Data streams can be used to store different versions of a file. For example, an application (such as a word processing application or a backup application) can periodically create a point-in-time copy of user data within a file as a new data stream within the file itself. As another example, a user could store several different versions of the same data as different data streams within the same file.

As the use of data streams becomes more commonplace, the traditional system of opening the unnamed data stream by default may become somewhat limiting. As an example, when each data stream stores a complete version of the user data stored in the file, it will be desirable to open a data stream other than the unnamed data stream by default. For example, it may be desirable to instead open the most recently created or edited data stream by default. Thus, new techniques for managing data streams are desired.

SUMMARY

Various embodiments of methods and systems for assigning symbolic names to data streams within a file are disclosed. In one embodiment, a method involves receiving a request to access a file that includes multiple data streams and then selecting one of the data streams to access, based on a symbolic name. In response to identifying that one of the data streams is associated with the symbolic name, that data stream is accessed.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 1 is a block diagram of a data processing system, according to one embodiment of the present invention.

FIG. 2 is an illustration of a file and metadata associated with the file, according to one embodiment of the present invention.

Figure 3:
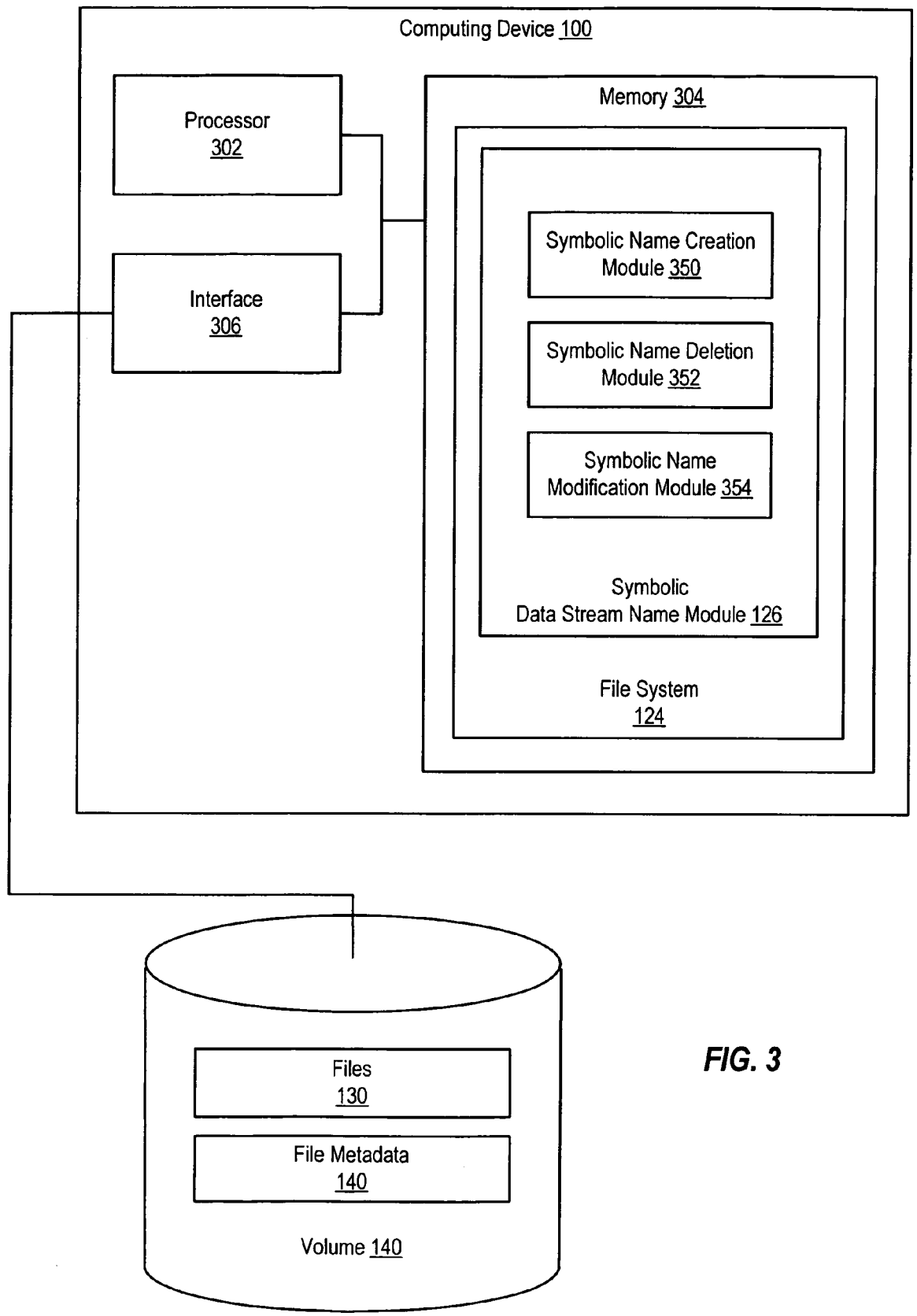
FIG. 3 is a block diagram of a computer system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a data processing system that can assign symbolic names to data streams within a file. As shown, a computing device 100 implements an application 122 and a file system 124. Computing device 100 is coupled to volume 140, which stores files 130 that are accessed by application 122 as well as file metadata 140, which describes files 130. Computing device 100 can be coupled to the storage device(s) that implement volume 140 directly or via a network (e.g., such as a SAN (Storage Area Network)).

Volume 140 can include one or more physical storage devices (e.g., in one embodiment, volume 140 is implemented on a storage array that includes several independent hard drives). Application 122 can access (e.g., create, delete, read, and write) files 130 stored on volume 140.

Computing device 100 is configured to execute software implementing various applications (e.g., application 122, file system 124, and the like). In such embodiments, computing device 100 can include a workstation, personal computer, server, Personal Digital Assistant (PDA), cell phone, storage network switch, storage device, storage array controller, or any other device configured to execute software implementing such applications. Alternatively, computing device 100 can be implemented from hardware (e.g., logic devices such as programmable logic devices (PLDs), field programmable gate arrays (FPGAs), and the like) configured to perform the functions of such applications, or from a combination of hardware and software implementing the functionality of the applications.

Application 122 is an application that accesses user data stored in files 130. It is noted that, although only a single application is shown in FIG. 1, multiple applications may execute on computing device 100 and access files 130.

Examples of such applications include word processing applications, database applications, graphics and/or video editing or and/or display applications, audio processing and/or display applications, backup applications, web server applications, and the like.

File system 124 organizes data into files and/or directories (a directory is a special type of file). The particular set of one or more directories and/or files that file system 124 organizes can also be referred to as a "file system." File system 124 generates and uses file metadata 140 when organizing and accessing the information that makes up files 130. It is noted that a file system need not include any user files (e.g., when the file system is created, the file system may include only a single file, which defines the root directory of the file system). In one embodiment, file system 124 is VERITAS File System (available from Symantec Corporation of Cupertino, Calif.). It is noted that a file system is itself an application.

File system 124 includes a symbolic data stream name module 126. Symbolic data stream name module 126 is configured to create, delete, and/or modify symbolic names (e.g., in response to requests received from an application).

Each symbolic name is as a tag or identifier that can be used to identify a data stream. When a symbolic name is created, symbolic data stream name module 126 generates metadata (e.g., part of metadata 140) corresponding to the symbolic name. A user can specify the value of the symbolic name (e.g., a string of alphanumeric characters). Each symbolic name created via symbolic data stream name module 126 is associated with a data stream within a file. Accordingly, the metadata will identify both the symbolic name and the data stream associated with that symbolic name. If the symbolic name is deleted, symbolic data stream name module 126 deletes the metadata that describes the deleted symbolic name. A user can modify a symbolic name via symbolic data stream name module 126 in order to change the value of the symbolic name and/or to change the data stream associated with that symbolic name.

FIG. 2 is an illustration of a file 132 and metadata 142 associated with the file. Metadata 142 is maintained by a file system (e.g., file system 124 of FIG. 1). As shown, file 132 includes data streams 134(1)-134(N). Each data stream can be identified by a different name, and one of the data streams can be an unnamed data stream (although in some embodiments, all data streams can have names).

File metadata 142 includes symbolic names 144(1)-144(N) and pointer 146(1)-146(N). Each pointer is associated with a respective symbolic name (e.g., pointer 146(1) is associated with symbolic name 144(1), pointer 146(2) is associated with symbolic name 144(2), and pointer 146(N) is associated with symbolic name 144(N)). It is noted that the number of symbolic names and pointers is the same (i.e., there is one pointer for each symbolic name), but the number of data streams and symbolic names can differ (e.g., there can be more symbolic names than data streams).

Each pointer 146(1)-146(N) stores information identifying either another symbolic name or a non-symbolic name. When an application opens (or otherwise attempts to access, e.g., to close) a data stream identified by a symbolic name, the file system will use the symbolic name to select the pointer associated with that symbolic name. The application can then open the data stream identified by the associated pointer. If the pointer specifies a non-symbolic data stream name, the application will open that data stream. If the pointer specifies another symbolic name, the file system will look up that symbolic name to find the associated pointer. This process can be repeated until a pointer identifying a non-symbolic name is located. The non-symbolic name can then be returned to the application.

Whenever an application (such as application 122 of FIG. 1) or user attempts to access a data stream, the application or user can specify a non-symbolic data stream name, or a symbolic data stream name, or no name at all. The appropriate data stream to access is then identified based on the name or symbolic name (if any) provided. The selected data stream is then processed, displayed to a user, or otherwise handled by the application. For example, if a word processing application opens a particular data stream, that particular data stream will be displayed in an editing window for a user to view and/or edit.

When no data stream name is provided, the file system can direct the application to open the unnamed data stream. Alternatively, the file system can be configured to direct applications to open the data stream associated with a particular symbolic name (e.g., the symbolic name "default") in situations in which no name is provided. When a non-symbolic data stream name is specified, the file system can direct the application to open the data stream identified by that non-symbolic name.

When a symbolic name is specified or implied (e.g., when no name is provided, a symbolic name such as "default" can be implied), the file system accesses the metadata associated with the file and searches for the pointer associated with the specified or implied symbolic name. If the pointer identifies a data stream, the file system directs the application to open that data stream. If the pointer identifies another symbolic name, the file system searches the metadata for the pointer associated with the other symbolic name. This process can repeat until a non-symbolic name is obtained.

Data streams 134(1)-134(N) can be used to store a variety of different information. For example, in one embodiment, data streams can be used to implement file-level versioning. In such an embodiment, each time that a new point-in-time copy of user data is created, that point-in-time copy is stored as a new data stream within the file. For example, initially the user data can be stored in the unnamed data stream. When the first point-in-time copy is created (e.g., at noon on December 13), a new data stream named "Dec13" can be created, and the first point-in-time copy is stored in the "Dec13" data stream within the file. The first point-in-time copy is a copy of the user data that was stored in the unnamed data stream at noon on December 13.

Each point-in-time copy can be a full copy of the user data or a copy of only the portions of the user data that have been modified since the last point-in-time copy was generated (e.g., such incremental copies can be created using copy-on-write (COW) techniques). Each new version (point-in-time copy) of the user data is thus stored in a different data stream.

If an application wants to be able to open the most recent version of the user data without analyzing all of the data streams, the application can create a symbolic name (e.g., "MostRecentVersion") for the most recent data stream. Each time a new data stream is created, the application can update the pointer associated with the symbolic name "MostRecentVersion" to identify the newly created data stream. Thus, when the "Dec13" is created, the pointer associated with symbolic name "MostRecentVersion" can be updated to identify "Dec13."

Additionally, if the file is restored to a previous version, the restore can be effected by simply updating the pointer associated with the "Default" data stream to identify the data stream containing the restore version. For example, if the file is restored to the version created at noon on Dec. 13, 2005, the pointer associated with the "Default" data stream can be updated to identify "Dec13." In this manner, the default version of the file is restored to the version created on December 13, without the need to physically copy any data from one data stream to another.

In addition to a "MostRecentVersion" symbolic name, other symbolic names such as "Stable," "Reviewed," "Verified," and the like can be created. If a data stream is reviewed, verified, locked from further editing, or the like, the pointer associated with the appropriate symbolic name can be updated to identify that data stream. It is noted that several different symbolic names can identify the same data stream.

In other embodiments, one data stream (e.g., data stream 134(1)) stores a movie file, while other data streams (e.g., data streams 134(2)-134(N)) can be used to store different audio tracks (e.g., each in a different language). A user can specify a language preference (e.g., French), and based on that preference, the application can update a pointer associated with a "DefaultLanguage" symbolic name to identify the data stream that stores the preferred language. If the user changes her language preference, the "DefaultLanguage" pointer can be updated to point to the data stream that stores the appropriate audio track. Once the pointer associated with the "DefaultLanguage" symbolic name is updated based on the user preference, any other application that is configured to use the "DefaultLanguage" symbolic name when accessing the audio track will automatically be redirected to the appropriate language for the user.

Similarly, in some embodiments, each data stream 134(1)-134(N)) can store a different translation of a document in order to provide multi-lingual support. A user can specify a preferred language, and a pointer associated with a "Default" symbolic name can be updated to point to the data stream that contains the user's preferred language. When the user reads the file, the data stream containing the preferred language will be opened by default.

In still other embodiments, one data stream (e.g., an unnamed data stream) can store user data, while other data streams can be used to hold meta information about the user data (e.g., one data stream can store relevant search keywords for the user data, another can store appropriate digital signatures or checksums, and still another can store file access statistics and the like). Depending upon the user's viewing preference, one of these data streams can be identified by the pointer associated with the "Default" symbolic name. Additionally, if multiple versions of a certain type of information (e.g., user data, statistics, or the like) are maintained, different symbolic names (e.g., "current," "old," "recent," and the like) can be associated with the data streams storing different versions of that type of information.

In another embodiment, one data stream can store the full content of a document (e.g., a resume or article), while another data stream stores an abstract. A user can specify a viewing preference for either full content or abstracts, and the pointer associated with the "Default" symbolic name can be updated to identify the appropriate data stream.

In yet another embodiment, each data stream can store a different "view" of the file (e.g., publisher's view, editor's view, general public view, and the like). Each user can be identified as a particular type of viewer (e.g., a publisher, an editor, a member of the general public, and the like). Based on the type of viewer accessing the file, the pointer associated with the "Default" symbolic name can be updated to point to the appropriate data stream for that type of viewer.

A user or application can assign a non-symbolic name to a data stream using conventional techniques. The file system provides an application programming interface (API) to symbolic data stream name module 126 that allows users or applications to interact with symbolic data stream name module 126 in order to create, modify, and delete symbolic names that are associated with data streams within files.

In the examples described above, symbolic data stream names are strings, which are maintained as part of file system metadata, that are associated with pointers to symbolic or non-symbolic data stream names. In alternative embodiments, the symbolic data stream names can be implemented using symbolic link or shortcut mechanisms. For example, a user can create a symbolic link that references a named data stream within a file (e.g., the symbolic link can include a path name that identifies both the file and the named data stream). When the user opens the symbolic link, the named data stream referenced by the symbolic link is opened. In this example, the name of the symbolic link acts as the symbolic data stream name. As another example, a user can create a shortcut (e.g., represented by an icon on a desktop) that references a named data stream within a file. When the user selects the icon (e.g., by clicking or double-clicking on the icon), the named data stream referenced by the shortcut will be opened. The icon and/or name of the shortcut acts as the symbolic data stream name in this example. In both of these examples, the symbolic link or shortcut is a file, identified by a name and/or icon, that stores information identifying a file as well as a named data stream within a file. In some embodiments, such symbolic links and shortcuts can also identify other symbolic links and/or other symbolic data stream names instead of directly identifying a file and/or named data stream within the file.

FIG. 3 is a block diagram of a computing device 100 that implements a file system 124 that provides a symbolic data stream name module 126. It is noted that, in alternative embodiments, symbolic data stream name module 126 can be implemented independently (instead of being implemented as part of a file system). FIG. 3 illustrates how symbolic data stream name module 126 can be implemented in software.

As illustrated, computing device 100 includes one or more processors 302 (e.g., microprocessors, PLDs (Programmable Logic Devices), or ASICs (Application Specific Integrated Circuits)) configured to execute program instructions stored in memory 304. Memory 304 can include various types of RAM (Random Access Memory), ROM (Read Only Memory), Flash memory, MEMS (Micro Electro-Mechanical Systems) memory, and the like. Computing device 300 also includes one or more interfaces 306. Processor 302, memory 304, and interface 306 are coupled to send and receive data and control signals by a bus or other interconnect.

Interface(s) 306 can include an interface to a storage device (e.g., volume 140) on which files 130 and associated metadata 140 (e.g., including symbolic data stream names and pointers) are stored. Interface(s) 306 can also include an interface to a network for use in communicating other devices. Interface(s) 306 can also include interfaces to various peripheral Input/Output (I/O) devices.

The program instructions and data implementing file system 124 can be stored on various computer readable media such as memory 304. In some embodiments, such software is stored on a computer readable medium such as a CD (Compact Disc), DVD (Digital Versatile Disc), hard disk, optical disk, tape device, floppy disk, and the like). In order be executed by processor 302, the instructions and data implementing file system 124 are loaded into memory 304 from the other computer readable medium. The instructions and/or data can also be transferred to computing device 100 for storage in memory 304 via a network such as the Internet or upon a carrier medium.

As shown, symbolic data stream name module 126 can include a variety of different modules, such as symbolic name creation module 350, symbolic name deletion module 352, and symbolic name modification module 354. Symbolic name creation module 350 is used to create new symbolic names. When a new symbolic name is created for a file, symbolic name creation module 350 stores the new symbolic name (e.g., received from a user or an application as part of a request to create a new symbolic name) as part of the metadata associated with the file. In some embodiments, when creating a file, file system 124 will automatically cause symbolic name creation module 350 to create a default symbolic name and update the pointer associated with the default symbolic name to point to the unnamed data stream.

When creating a new symbolic name, symbolic name creation module 350 also allocates storage for a pointer associated with the symbolic name in the file metadata. If the pointer value is provided as part of the request to create the symbolic name, the value can be stored in the storage allocated for the pointer at creation time.

The pointer value for a symbolic name can include the name of a named data stream or another symbolic name. For example, symbolic name "Default" can be associated with named data stream "Dec14" by specifying "Dec14" as the pointer value associated with "Default."

Similarly, symbolic name "StableVersion" can be associated with symbolic name "Current" by specifying "Current" as the pointer value associated with "StableVersion." Symbolic name "Current" is in turn associated with named data stream "Dec15." If an application attempts to open "StableVersion," the file system will search the metadata associated with the file to locate the pointer value associated with symbolic name "StableVersion." The file system will identify that the pointer value is another symbolic name, "Current," and will accordingly access the metadata that is allocated to symbolic name "Current." Since the pointer value associated with symbolic name "Current" identifies a named data stream, "Dec15", the file system will cause the application to open named data stream "Dec15." Accordingly, when the application attempts to open a data stream by specifying symbolic name "StableVersion," the application will open named data stream "Dec15."

When creating a new symbolic name, symbolic name creation module 350 will allocate metadata to store the value of the symbolic name as well as a pointer value. The value of the symbolic name is specified at creation time and stored as part of the metadata. The pointer value can be specified at creation time or at a later time. When a pointer value is specified, the data stream identified by that pointer value becomes associated with the symbolic name. For example, a data stream named "Properties" can be associated with the symbolic name "EditInfo" by storing the data stream name "Properties" as the pointer value associated with symbolic name "EditInfo."

In one embodiment, symbolic name creation module 350 can be used to create both named data streams and symbolic names for data streams. Symbolic name creation module 350 can identify which action to perform (create a new named data stream or create a new symbolic name) based on the request. For example, if a special flag or other parameter (or if a particular value of such a flag or parameter) is included in the request, symbolic name creation module 350 will create a new symbolic name; otherwise, symbolic name creation module 350 will create a new named data stream. When a symbolic name is created, storage for a pointer value is allocated as part of the metadata, but no new data stream is allocated. In contrast, when a named data stream is created, a new data stream is allocated as part of the specified file, but no storage for a pointer value is allocated as part of the metadata. Thus, named data streams are actual data streams, while symbolic names are simply tags or identifiers that can be associated with data streams.

Symbolic name deletion module 352 is configured to delete symbolic names. When a request to delete a symbolic name is received (e.g., from an application), symbolic name deletion module 352 deallocates the storage for the specified symbolic name and the pointer associated with the symbolic name. Thus, symbolic name deletion module 352 can delete the specified symbolic name and the associated pointer value from the metadata associated with the file.

In some embodiments, symbolic name deletion module 352 is also configured to delete named data streams. Symbolic name deletion module 352 can differentiate between requests to delete named data streams and requests to delete symbolic names based on flags or other parameters supplied in the request for deletion. When a named data stream is deleted, the actual data stream is deleted from the file (e.g., by deallocating storage that previously stored that data stream). In contrast, when a symbolic name is deleted, only metadata used to store the symbolic name and associated pointer value is deleted. The data stream that was previously identified by that symbolic name is not deleted.

Symbolic name modification module 350 is used to atomically modify an existing symbolic name. Symbolic name can be modified (either to change the symbolic name or to change the value of the pointer associated with the symbolic name) by specifying the symbolic name, the new value of the symbolic name, and/or the new value of the pointer.

Symbolic name modification module 350 can be used to change which data stream is associated with a particular symbolic name. For example, an application can modify symbolic name "Default" by specifying a new pointer value, "Dec14." Prior to the modification, the pointer value is "Dec13." "Dec13" and "Dec14" are values that identify two different named data streams. Prior to the modification, symbolic name "Default" is associated with named data stream "Dec13"; subsequent to the modification, symbolic name "Default" is associated with named data stream "Dec14."

It is noted that symbolic name modification module 350 is optional. In other embodiments, symbolic names can be modified by first deleting the existing symbolic name and then creating a new symbolic name, using the deletion and creation modules.

To associate a symbolic name with a data stream, the user or application provides the file system with the symbolic name as well as the name of the data stream. (e.g., during symbolic name creation or modification. To open a particular data stream, the user or application generates a file open request that specifies a symbolic name associated with that data stream.

Figure 4:
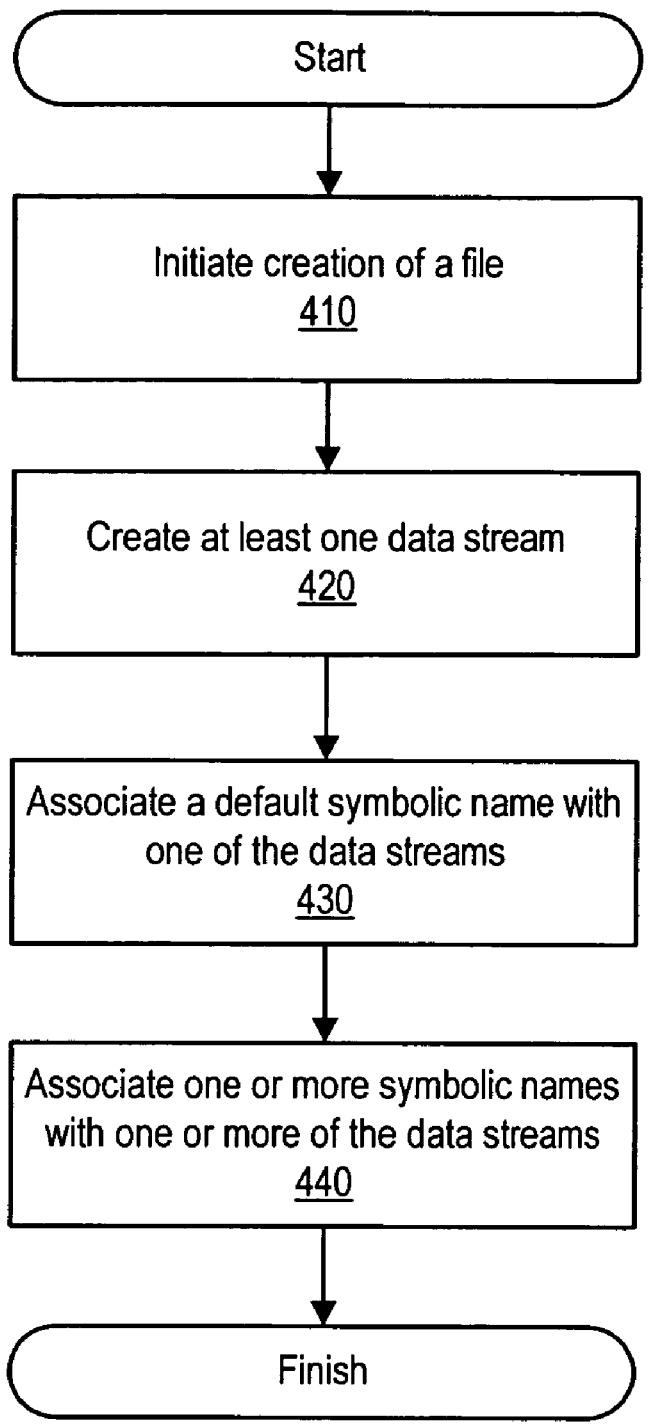
FIG. 4 is a flowchart of a method of assigning a symbolic name to a data stream within a file, according to one embodiment of the present invention.

FIG. 4 is a flowchart of a method of associating a symbolic name with a data stream within a file. This method can be performed by a file system (such as file system 124 of FIGS. 1 and 3).

The method begins at 410, when file creation is initiated. During the file creation process, the file system creates at least one data stream (e.g., an unnamed data stream) within the file, as shown at 420. Information within each data stream can be accessed independently of information within other data streams; however, all of the data streams are stored as part of the same file.

The file system then associates a default symbolic name with one of the data streams, as shown at 430. For example, the file system can associate the symbolic name "Default" with the unnamed data stream.

A symbolic name can be associated with a data stream by updating a pointer, associated with the symbolic name, to identify the data stream (e.g., by setting the value of the pointer to equal the non-symbolic name of the data stream). Both the symbolic name and the pointer are stored as part of the metadata that is associated with the file that includes the data stream. For example, the symbolic name "Default" can be associated with the unnamed data stream by storing "Unnamed" (or another value that identifies the unnamed data stream) as the pointer value associated with symbolic name "Default."

Operation 430 can be performed during file creation time or, alternatively, at a time subsequent to the file's creation. In the latter scenario, operation 430 can be performed in response to a request generated by a user or application.

At 440, one or more additional symbolic names are associated with one or more of the data streams in the file in the same way that the default symbolic name is associated with a data stream. It is noted that more than one symbolic name can be associated with the same data stream. Operation 440 can be performed in response to a symbolic name creation or modification request generated by a user or application.

Additionally, a symbolic name can be indirectly associated with a data stream by associating the symbolic name with another symbolic name. The other symbolic name is already associated with the data stream. For example, if the symbolic name "Current" is associated with named data stream "Version7," the symbolic name "UserView" can be indirectly associated with the named data stream "Version7" by associating "UserView" with "Current." However, if "Current" is modified so that it is associated with another named data stream, this modification will also affect "UserView" (i.e., after the modification of "Current," "UserView" will also be associated with the other named data stream).

In another example, one view, named "Dec14," can be associated with symbolic name "View1." "View1" can in turn be associated with the "Current" symbolic name. Accordingly, when an application requests the "Current" data stream, the application will open "Dec14." A day later, a data stream named "Dec15" is created and associated with symbolic name "View2." The "Current" symbolic name is then associated with "View2." Now, when the application requests the "Current" data stream, the application will open "Dec15."

It is noted that the operations shown in FIG. 4 can be performed in a different order in other embodiments. Additionally, some embodiments may eliminate certain operations (for example, in some embodiments, a default symbolic name is not provided) or perform other operations instead of and/or in addition to those disclosed in FIG. 4.

Figure 5:
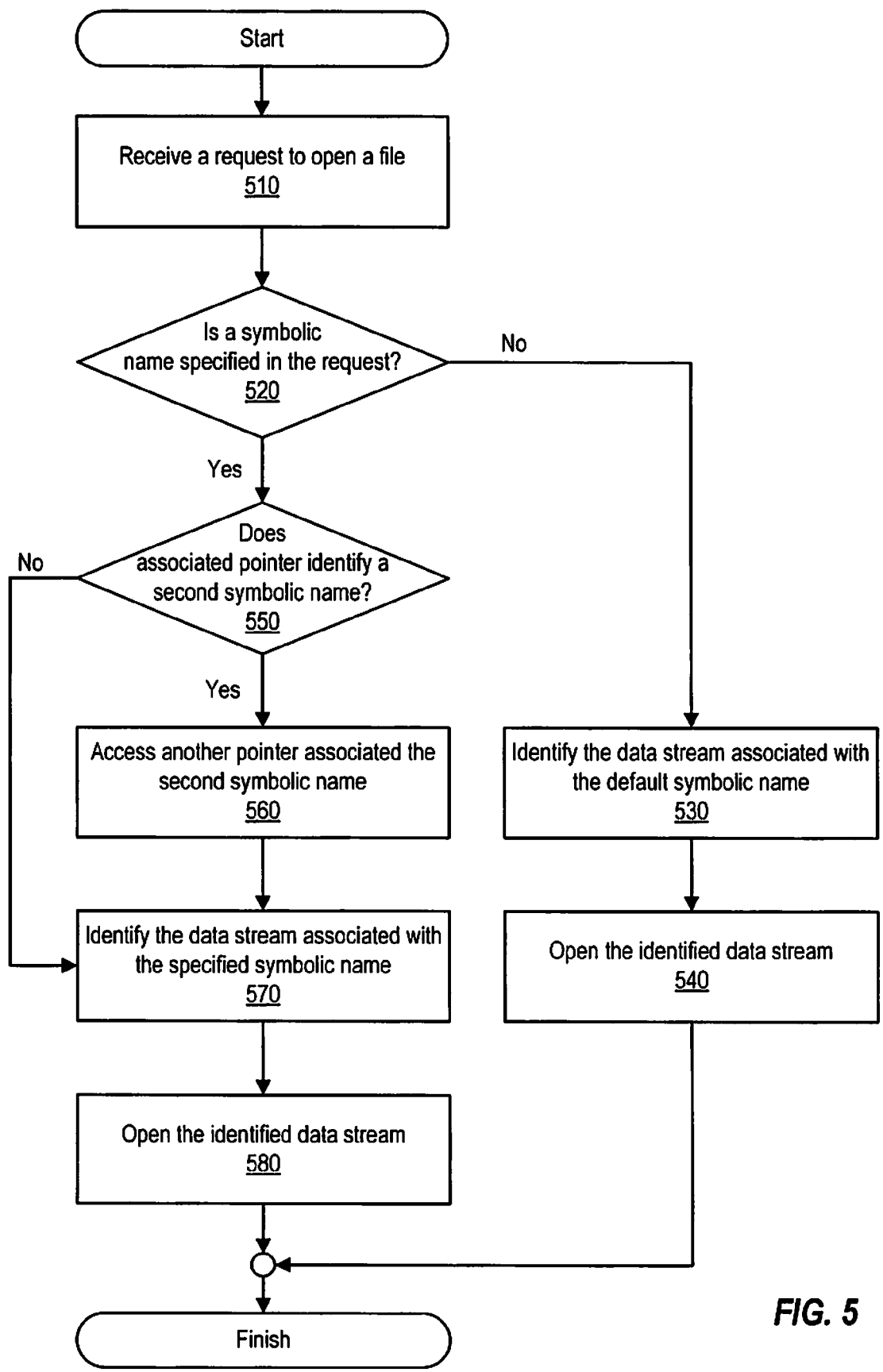
FIG. 5 is a flowchart of a method of opening a data stream based on a symbolic name, according to one embodiment of the present invention.

FIG. 5 is a flowchart of a method of opening a data stream based on a symbolic name. This method can be performed by a file system (such as file system 124 of FIGS. 1 and 3). Functions similar to those shown in FIG. 5 can also be performed in order to perform other types of access (e.g., closing a file) to a file, instead of and/or in addition to opening a file.

The method begins at 510, when the file system receives a request to open a file. If no symbolic name is specified in the request, as determined at 520, the file system identifies the data stream associated with the default symbolic name (e.g., by accessing a pointer associated with the default symbolic name), as shown at 530. At 540, the file system opens the data stream identified at 530.

If the request to open the file does specify a symbolic name, the file system identifies the data stream associated with the symbolic name, as shown at 570. The file system identifies the data stream associated with the symbolic name by accessing the metadata associated with the file. The file system can lookup the symbolic name in the metadata associated with the file. Once the symbolic name is located, the file system can access the pointer associated with the symbolic name. The value of the pointer is then used to identify the associated data stream.

The pointer can directly identify the named data stream. For example, the value of the pointer can be the name of the named data stream. In this situation, it is determined at 550 that the value of the pointer is not a second symbolic name. Consequently, the file system identifies that the named data stream is associated with the symbolic name, as shown at 570.

The pointer can also identify a named data stream indirectly. For example, the value of the pointer for a first symbolic name can be a second symbolic name. In this situation, it is determined at 550 that the value of the pointer is a second symbolic name. That second symbolic name can in turn have a pointer that directly identifies a named data stream. Consequently, the pointer associated with the second symbolic name is accessed, as shown at step 560, and this pointer is used to identify the named data stream, as shown at step 570. In this situation, the pointer for the first symbolic name indirectly identifies the named data stream.

Thus, the file system can use the value of a pointer associated with the specified symbolic name to identify an associated data stream. The identified data stream is then opened, as shown at 580.

It is noted that the method of FIG. 5 is provided as an example, and that other embodiments can be implemented differently. For example, in some embodiments, a default symbolic name may not be implemented. Those embodiments can open the unnamed data stream instead of opening the data stream associated with the default symbolic name.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting a request to access a file, wherein the file comprises a plurality of data streams; and
   selecting one of the data streams to be accessed, based on a symbolic name associated with the one of the data streams, wherein
   the detecting and the selecting are performed by a computing device implementing a file system,
   a non-symbolic name is associated with the one of the data streams, and
   the selecting comprises:
      accessing a pointer associated with the symbolic name,
      detecting that the pointer identifies an other symbolic name instead of one of the plurality of data streams, and
      accessing an other pointer associated with the other symbolic name in response to the detecting.

2. The method of claim 1, wherein the request to access the file is a request to open the file.

3. The method of claim 1, further comprising:
   associating the symbolic name with the one of the data streams included in the file.

4. The method of claim 3, wherein
the one of the data streams is a non-default data stream.

5. The method of claim 3, wherein
the one of the data streams is a default data stream.

6. The method of claim 5, further comprising:
creating the file, wherein the creating the file comprises the associating the symbolic name with the one of the data streams.

7. The method of claim 1, wherein
the symbolic name comprises one of: a desktop shortcut icon and a name of a symbolic link.

8. The method of claim 1, wherein the request to access the file specifies the symbolic name.

9. The method of claim 1, wherein
each of the data streams stores a respective point-in-time copy of user data; and
the symbolic name is associated with a most-recently-created data stream of the data streams.

10. A system comprising:
computer readable storage means for storing metadata associated with a file, wherein the metadata comprises a symbolic name and a pointer associated with the symbolic name;
means for detecting a request to access a file, wherein the file comprises a plurality of data streams; and
means for selecting one of the data streams to be accessed, based on the symbolic name associated with the one of the data streams,
wherein
a non-symbolic name is associated with the one of the data streams, and
the means for selecting comprises:
means for accessing a pointer associated with the symbolic name,
means for detecting that the pointer identifies an other symbolic name instead of one of the plurality of data streams, and
means for accessing an other pointer associated with the other symbolic name in response to the detecting.

11. The system of claim 10, wherein the request to access the file specifies the symbolic name.

12. A non-transitory computer readable medium comprising program instructions executable to:
maintain metadata, wherein the metadata identifies that a symbolic name is associated with one of a plurality of data streams, wherein the metadata includes the symbolic name and a pointer to the one of the plurality of data streams, and wherein a file comprises the plurality of data streams;
detect that the pointer identifies an other symbolic name—instead of one of the plurality of data streams;
access an other pointer associated with the other symbolic name in response to the detecting; and
update the metadata.

13. The non-transitory computer readable medium of claim 12, wherein
the one of the data streams is a default data stream.

14. The non-transitory computer readable medium of claim 13, further comprising program instructions executable to:
create the file, wherein creating the file comprises associating the symbolic name with the one of the data streams.

15. The non-transitory computer readable medium of claim 12, further comprising program instructions executable to:
detect a request to access the file; and
select the one of the data streams to be accessed, based on the symbolic name.

16. The non-transitory computer readable medium of claim 12, wherein the program instructions are executable to update the metadata by deleting the symbolic name.

17. The non-transitory computer readable medium of claim 12, wherein the program instructions are executable to update the metadata in order to indicate that the symbolic name is associated with a second one of the plurality of data streams.

18. The non-transitory computer readable medium of claim 12, wherein the program instructions are executable to create new metadata, wherein the new metadata identifies that a second symbolic name is associated with a second one of the plurality of data streams.

19. The non-transitory computer readable medium of claim 12, wherein the program instructions are executable to create new metadata, wherein the new metadata identifies that a second symbolic name is associated with the one of the plurality of data streams.

20. A system comprising:
a storage device, wherein the storage device is configured to store a file comprising a plurality of data streams; and
a file system coupled to the storage device, wherein the file system comprises a symbolic data stream name module configured to:
detect a request to access the file,
select one of the data streams to be accessed, based on a symbolic name associated with the one of the data streams,
wherein
a non-symbolic name is associated with the one of the data streams,
detect that a pointer associated with the symbolic name identifies an other symbolic name instead of one of the plurality of data streams, and
access an other pointer associated with the other symbolic name in response to the detecting.

21. The system of claim 20, wherein the symbolic data stream name module is further configured to:
associate the symbolic name with the one of the data streams included in the file by generating metadata comprising the symbolic name and pointer to the one of the data streams.

22. The system of claim 20, wherein
the request to access the file specifies the symbolic name.

* * * * *